US012731310B2

(12) United States Patent
Yu et al.

(10) Patent No.: US 12,731,310 B2
(45) Date of Patent: Sep. 8, 2026

(54) CORRECTION METHOD FOR IMAGE COLOR RANGE CONVERSION AND IMAGE-PROCESSING SYSTEM

(71) Applicant: REALTEK SEMICONDUCTOR CORP., Hsinchu (TW)

(72) Inventors: Chen-Wei Yu, Hsinchu (TW); Chin-Tien Lu, Hsinchu (TW)

(73) Assignee: REALTEK SEMICONDUCTOR CORP, Hsinchu (TW)

( * ) Notice: Subject to any disclaimer, the term of this patent is extended or adjusted under 35 U.S.C. 154(b) by 218 days.

(21) Appl. No.: 18/395,703

(22) Filed: Dec. 25, 2023

(65) Prior Publication Data

US 2024/0212099 A1 Jun. 27, 2024

(30) Foreign Application Priority Data

Dec. 26, 2022 (TW) ................................. 111149860

(51) Int. Cl.
*G06T 5/00* (2024.01)
*G06T 7/90* (2017.01)
*G06T 11/60* (2006.01)

(52) U.S. Cl.
CPC .................. *G06T 5/00* (2013.01); *G06T 7/90* (2017.01); *G06T 11/60* (2013.01); *G06T 2207/10024* (2013.01)

(58) Field of Classification Search
CPC ... G06T 5/00; G06T 7/90; G06T 11/60; G06T 2207/10024
USPC .......................................................... 345/600
See application file for complete search history.

(56) References Cited

U.S. PATENT DOCUMENTS

| | | | | |
|---|---|---|---|---|
| 7,580,081 | B2 | 8/2009 | Tamano et al. | |
| 7,668,365 | B2 * | 2/2010 | Imai | G06V 20/10 382/164 |
| 8,355,574 | B2 * | 1/2013 | Imai | G06V 20/10 382/167 |
| 2004/0062522 | A1 * | 4/2004 | Kitora | H04N 19/60 386/328 |
| 2011/0032998 | A1 | 2/2011 | Jin | |

FOREIGN PATENT DOCUMENTS

| | | | |
|---|---|---|---|
| CN | 103002225 | A | 3/2013 |
| CN | 113099200 | A | 7/2021 |

* cited by examiner

*Primary Examiner* — Thomas J Lett
(74) *Attorney, Agent, or Firm* — Li & Cai Intellectual Property Office

(57) ABSTRACT

A correction method for image color range conversion and an image-processing system are provided. In the correction method, when an image is received, an actual color range of the image can be obtained by counting a pixel value of the image. A color range can be a full color range or a limited color range. If the actual color range is inconsistent with the color range recorded in an image packet, the image-processing system performs a color-range correction procedure. A linear mapping method can be incorporated for converting pixels of the image from the limited color range to the full color range. In particular, the color-range correction procedure can be gradually performed in a multi-stage manner, so as to accurately and smoothly convert the color range of the image for a subsequent image-processing procedure.

13 Claims, 8 Drawing Sheets

CORRECTION METHOD FOR IMAGE COLOR RANGE CONVERSION AND IMAGE-PROCESSING SYSTEM

CROSS-REFERENCE TO RELATED PATENT APPLICATION

This application claims the benefit of priority to Taiwan Patent Application No. 111149860, filed on Dec. 26, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a technology of correcting a color range of an image in a specific color space, and more particularly to a correction and conversion method for an image according to a detected color range and an image-processing system thereof.

BACKGROUND OF THE DISCLOSURE

Image data inputted to an audiovisual device can often be transmitted in a color coding manner. When the audiovisual device processes the image data, information recorded in packets of the image data is required for image processing or when performing a subsequent treatment based on, e.g., information of a color range.

Taking a YUV image as an example, the color range of the YUV image denotes ranges of luminance and chrominance in a YUV color space. The color range can be divided into a narrow (or limited) color range with a luminance range [16, 235] and a chrominance range [16, 240], and a full color range with a range [0, 255]. For example, according to the standard of ITU.BT709/ITU.BT2100, a luminance limited range can be $[16*2^{n-8}, 235*2^{n-8}]$, and a chrominance limited range can be $[16*2^{n-8}, 240*2^{n-8}]$. Here, "n" represents a number of image sequence bits, and a minimum value thereof is 8 ($n \geq 8$).

Generally speaking, in the input image data, a header of each image sequence packet records the color range. Based on the color range, a processing circuit of the audiovisual device processes the image data, such as converting the image data to images that are in compliance with a specific transmission format (e.g., HDMI), or blending an input image into a specific playback interface.

However, image packets in multiple pieces of the image data may lack information of the color range, or the header may record wrong information of the color range. This can cause the subsequent treatment to be erroneous and result in a color distortion problem.

Conventionally, in order to solve the above-mentioned problem, the processing circuit of the audiovisual device acquires an accurate color range of an image according to statistical data of image pixels, and corrects the image based on the accurate color range. However, during an image correction process, a real-time correction of brightness or color may result in a sudden change of brightness or color, thereby negatively affecting the quality of the image to be viewed by users.

SUMMARY OF THE DISCLOSURE

In response to the above-referenced technical inadequacy (i.e., an image needs to be corrected due to lack of information of a color range of the image or wrong information of the color range, or the image is affected due to a sudden change in an image correction process), the present disclosure provides a correction method for image color range conversion and an image-processing system.

In the correction method for the image color range conversion that is performed in the image-processing system, an image is firstly obtained, and image data is stored to a buffer. An actual color range of the image can be obtained by counting a pixel value of the image in the buffer. The actual color range can be a full color range or a limited color range. If the actual color range is inconsistent with the color range recorded in image packets, a color-range correction procedure is performed for correctly processing the image.

Further, the image-processing system sets up an upper threshold and a lower threshold. In the step of counting the pixel value of the image, the pixel value of all pixels or sampled pixels of the image is compared with the upper threshold and the lower threshold, a quantity of the pixels having the pixel value that is larger than the upper threshold or is smaller than the lower threshold is calculated, and the quantity of the pixels is compared with a quantity threshold, so as to determine the actual color range of the image.

Further, in the color-range correction procedure, a linear mapping method is used to convert all of the pixels of the image from the limited color range to the full color range. In particular, the color-range correction procedure can adopt a gradual conversion method that gradually performs color range conversion on the image based on a multi-stage correction process set in the linear mapping method. In the gradual conversion method, the color range conversion is performed by adjusting one stage in each process to output one image until the image is completely converted to the full color range.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
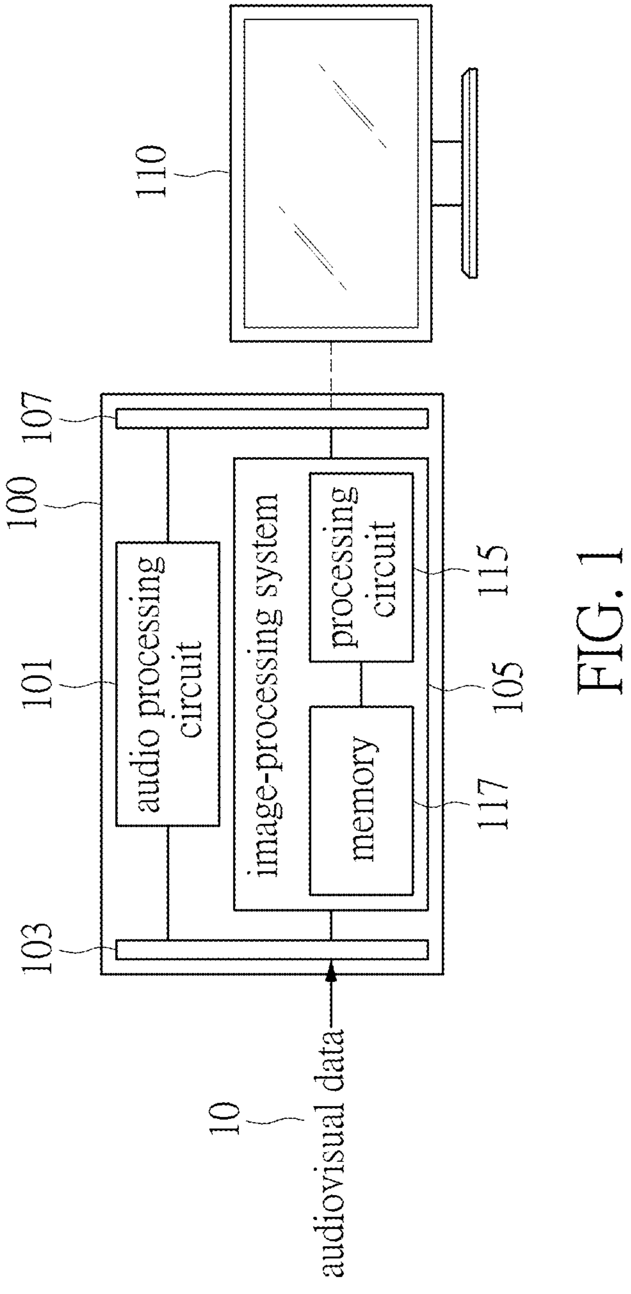
FIG. 1 is a schematic diagram illustrating a device that adopts a correction method for image color range conversion according to one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

General image data can be transmitted to an audiovisual device in a color coding manner. Based on a color range of the image data, a processing circuit of the audiovisual device can perform an image processing process, so as to output the image data to a display via a specific transmission format (e.g., HDMI), or output the image data after the image data is blended into a specific playback interface. Generally, a video is transmitted and displayed in a color coding format, such as YUV or RGB. A YUV color space defines a luminance component "Y" and two chrominance components "U" and "V." Taking the YUV color space as an example, the color range indicates ranges of the luminance and chrominance components of the YUV color space, and can be divided into a limited (or narrow) color range and a full color range. In an 8-bit YUV-coded video, a pixel value of the limited color range ranges from 16 to 235, and a pixel value of the full color range ranges from 0 to 255. In general, the color range of the video is recorded in a header of an image sequence packet. Based on information of the color range, the processing circuit of the audiovisual device can convert images of the video into images in a specific format, or blend the images of the video with a specific picture within the same color range. Then, final images are outputted.

However, image packets of the video may lack information of the color range, or even carry wrong information of the color range, such that the processing circuit processes the images with wrong information of the color range. This may result in the video having a color distortion problem. In view of the above-mentioned deficiencies, the present disclosure provides a correction method for image color range conversion and an image-processing system. A main aspect of the correction method is to acquire a color range of a video in a frame-by-frame manner by counting actual image data of the video. If the color range acquired from the actual image data is inconsistent with the color range recorded in the image packets that the processing circuit utilizes to process the images, the color range of subsequent images will be corrected. In another aspect of the present disclosure, during playing of the video, considering that a one-time correction upon the images may cause changes of luminance or colors of the images (such changes can have an effect similar to moving the image from a dark underground tunnel to a bright tunnel mouth) and affect the quality of the video to be viewed, a multi-stage correction process is incorporated in the correction method of the present disclosure to perform color range conversion by stages. Therefore, the color range of the video can be accurately and smoothly converted for performing a subsequent image-processing procedure. It should be noted that the multi-stage correction process incorporated in the correction method substitutes for the one-time correction and can prevent the quality of the video from being affected by significant changes of the luminance or the colors during the correction process.

Reference is made to FIG. 1, which is an exemplary diagram of a framework in an application scenario of the correction method for the image color range conversion according to one embodiment of the present disclosure.

FIG. 1 shows an exemplary example of an audiovisual device 100. The audiovisual device 100 can be a device built in a television system or an external device. The audiovisual device 100 includes a processing circuit that is a collaboration of software and hardware. In addition to an audio processing circuit 101, an image-processing system 105 is also included in the audiovisual device 100. The audiovisual device 100 receives audiovisual data 10 from a source via a wired or wireless input interface 103. An audio portion of the audiovisual data 10 is processed by the audio processing circuit 101, and a video portion of the audiovisual data 10 is processed by the image-processing system 105. In response to inconsistency of the color range, a processing circuit 115 in the audiovisual device 100 performs the correction method. A memory 117 is used to buffer the image data before and after processing. After the video and the audio are completely processed, the video and audio are outputted via an output interface 107. The video is outputted to a display 110 for display.

The correction method of the present disclosure is operated in the image-processing system 105. As for main steps of the correction method, reference can be made to a flowchart shown in FIG. 2.

Under general circumstances, the image-processing system 105 adapted to the audiovisual device 100 performs a follow-up procedure based on the color range (the limited color range or the full color range) recorded in the image packets of one video. If the color range is the limited color range, the images with the limited color range are required to be converted to the images with the full color range. Further, the images are combined with a picture of a playback interface before being outputted.

Figure 2:
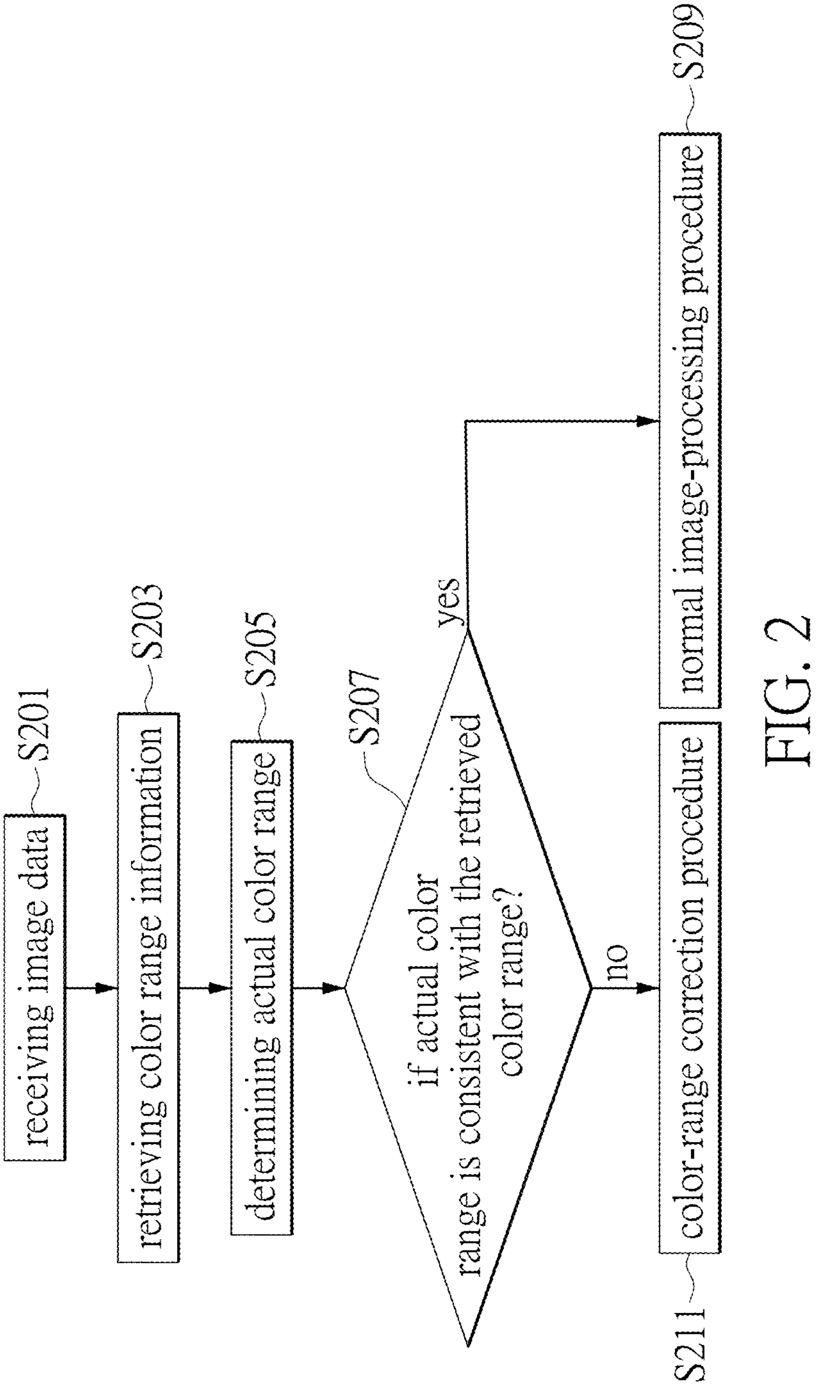
FIG. 2 is a major flowchart illustrating the correction method for the image color range conversion according to one embodiment of the present disclosure.

Referring to FIG. 2, in the correction method, the image data is retrieved from a buffer (step S201), and information of the color range of the image data can be extracted from the image packets (step S203). The pixel values of the pixels of the image data are counted. Then, based on a statistical result of the counted pixel values, an actual color range of the image data can be determined (step S205).

Next, in the correction method, it is determined whether or not the actual color range is consistent with the color range recorded in the image packets (step S207). If the actual color range is consistent with the color range recorded in the image packets, the image-processing system 105 operates a regular image-processing procedure that includes the color range conversion and requisite procedures before the video is outputted (step S209). Conversely, if the actual color range is inconsistent with the color range recorded in the image packets, this indicates that the images of the video have been incorrectly processed, and a color-range correction procedure needs to be performed in order to process the images correctly (step S211).

The above-mentioned method is essentially performed in the image-processing system. One of the objectives of the image-processing system is to convert the images from the limited color range to the full color range. Another objective is to perform the color range conversion in a step-by-step manner through the multi-stage correction process, so as to smoothly convert the video. In this way, an issue of a poor viewing experience caused by the one-time correction can be prevented.

Figure 3:
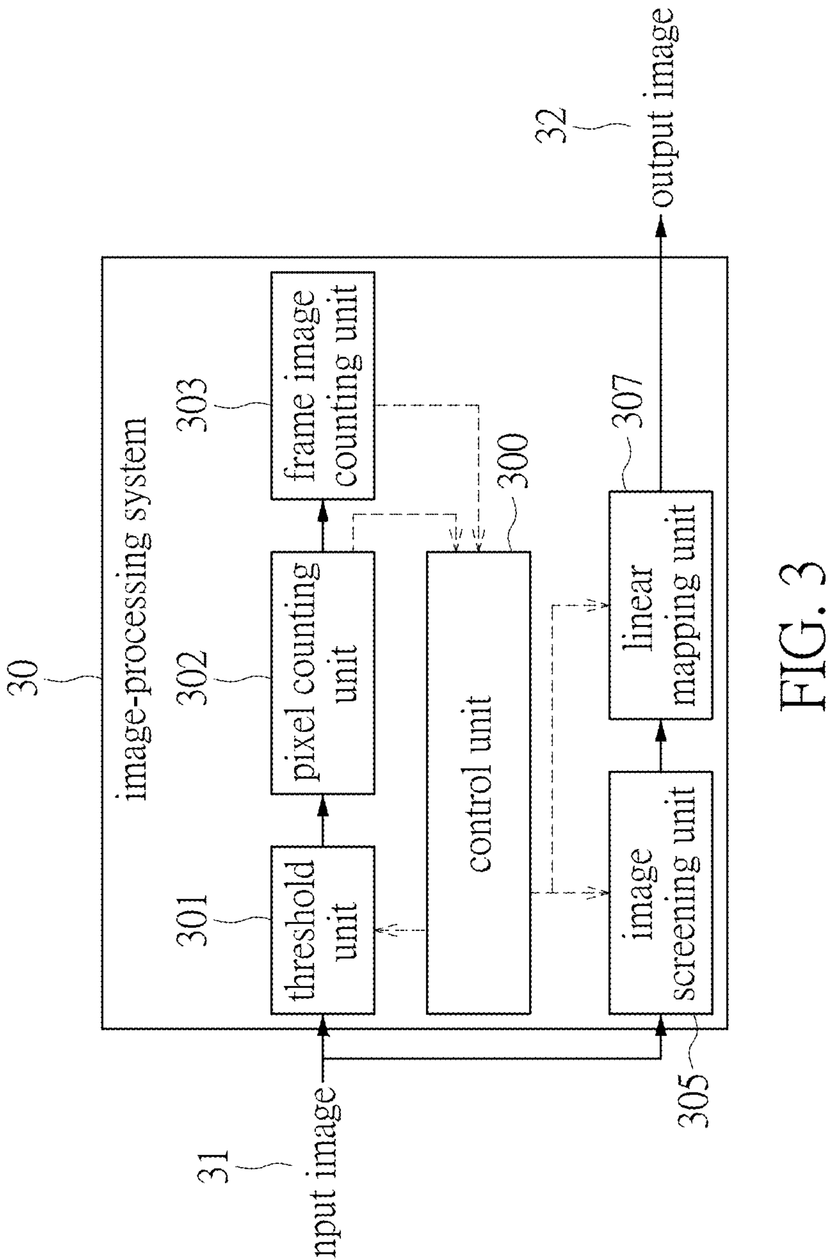
FIG. 3 is a schematic diagram depicting an image-processing system that operates the correction method for the image color range conversion according to one embodiment of the present disclosure.

Reference is made to FIG. 3, which is a schematic diagram of circuit modules that implement the image-processing system according to one embodiment of the present disclosure. A processing circuit of an image-processing system 30 shown in the diagram includes several basic circuit components, such as a control unit 300 and multiple circuit units electrically connected thereto. The control unit 300 is used to control operations of the circuit units (e.g., setting up thresholds, comparing, counting, determining a correction stage, setting up comparison conditions, and performing a procedure for gradual correction based on the correction stage).

Each of the circuit units can be represented by a digital circuitry that includes various logic gates and I/O terminals, and the circuit units can be divided by functions. As shown in the diagram, the control unit 300 sets up various thresholds by a threshold unit 301 according to a practical situation, determines the actual color range of the video according to a statistical result of a pixel counting unit 302 and a frame image counting unit 303. Further, when the color range conversion is necessary, an image screening unit 305 can decide the images to be processed in the color range conversion, and then a linear mapping unit 307 performs the color range conversion (which can particularly be a gradual conversion).

When the image-processing system 30 receives an input image 31, the pixel values of the input image 31 (which can be preset as a limited color range video) are firstly obtained. The threshold unit 301 of the image-processing system 30 is used to identify the pixel values that belong to the limited color range or the full color range by comparing the pixel values of all pixels or sampled pixels of the input image 31 with the thresholds. Since most of the pixel values (i.e., luminance and chrominance) of the pixels of the input image 31 in the limited color range and the full color range are overlapping, the above-mentioned thresholds are configured to distinguish the two types of the pixel values in the two color ranges. For example, the pixels belonging to the full color range can be effectively filtered out. The pixel counting unit 302 can be used to count the filtered pixels, so as to determine the color range of each frame based on a quantity of the filtered pixels. Afterwards, the frame image counting unit 303 is used to accumulate a quantity of the frames.

Figure 4:
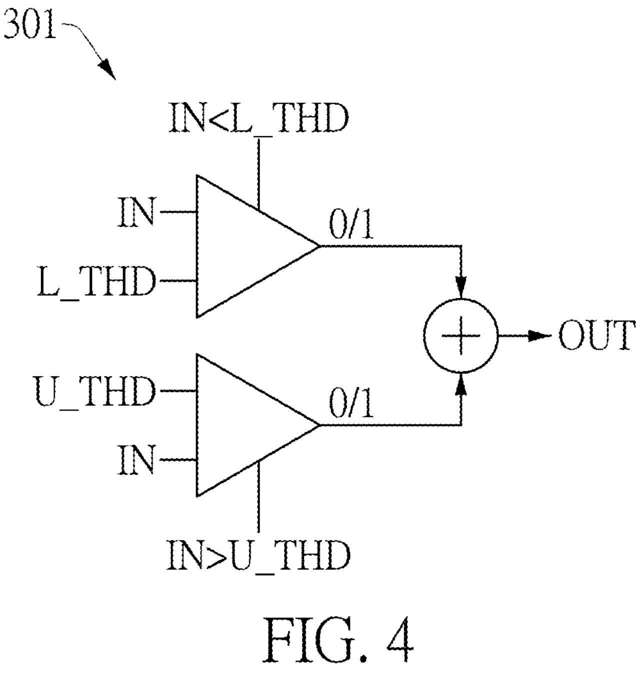
FIG. 4 is a schematic diagram depicting logic circuits that are used to set up thresholds in the image-processing system according to one embodiment of the present disclosure.

For one implementation of the threshold unit 301, reference can be made to a logic circuit shown in FIG. 4 that is used to set up the thresholds in the image-processing system.

In FIG. 4, two comparators are provided to compare pixel values IN of the input pixels with a lower threshold L_THD and an upper threshold U_THD, respectively. The pixel values indicate component values of the pixels in a specific color space, a "Y" component represents luminance values in the YUV color space, and "U" and "V" components represent chrominance values in the YUV color space.

The input pixel values IN are compared with the lower threshold L_THD. If a comparison result meets a condition of "IN<L_THD", an output is "1". Otherwise, the output is "0." In the meantime, the input pixel values IN are also compared with the upper threshold U_THD. If the comparison result meets a condition of "IN>U_THD", the output is "1". Otherwise, the output is "0." Therefore, an attribute of the color range of the input pixel values IN can be confirmed according to an output value OUT being "0" or "1".

For example, the pixel value of the full color range falls between 0 and $255(2^n-1)$, the limited color range of luminance of the pixels ranges between $16*2^{n-8}$ and $235*2^{n-8}$, and the limited color range of chrominance of the pixels ranges between $16*2^{n-8}$ and $240*2^{n-8}$. The above-mentioned "n" represents a number of image sequence bits, and a minimum value thereof is 8. The attribute of the color range of the image can be determined based on the pixels within a non-overlapping portion between the two ranges (i.e., the full color range and the limited color range). Therefore, the lower threshold L_THD can be set to "$16*2^{n-8}$." The upper threshold U_THD for luminance can be set to "$235*2^{n-8}$", and the upper threshold U_THD for chrominance can be set to "$240*2^{n-8}$". Here, "n" represents a number of image sequence bits, and a minimum value thereof is 8 (i.e., n≥8). Accordingly, the output value OUT can be used to determine whether or not the pixels are outside the limited color range [$16*2^{n-8}$, $240*2^{n-8}$]. For example, the output value OUT is "1" when the pixel is outside the limited color range (that is, the pixel can be determined to be within the full color range), and the output value OUT is "0" when the pixel is within the limited color range.

Figure 5:
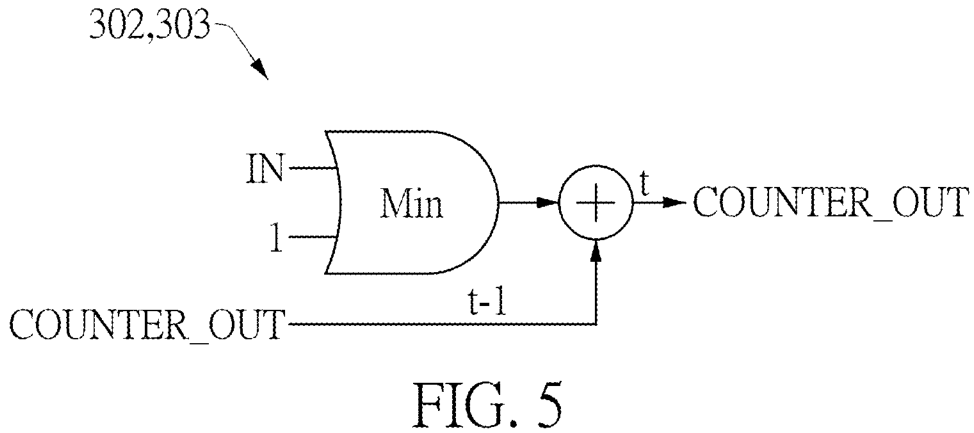
FIG. 5 is a schematic diagram depicting logic circuits that are used to perform counting in the image-processing system according to one embodiment of the present disclosure.

For the implementations of the pixel counting unit 302 and the frame image counting unit 303, reference can be made to logic circuits shown in FIG. 5 that are used to perform counting in the image-processing system.

According to the exemplary example shown in the diagram, a counter is implemented by an OR gate and an adder. An output value of the threshold unit 301 becomes an input value of the pixel counting unit 302 or the frame image counting unit 303. The input value IN can be 1 or 0. The OR gate is operated with 1, and the output value OUT is counted only if the output value OUT is 1. A counting value COUNTER_OUT is outputted at a current time (t), and can be accumulated with the counting value COUNTER_OUT at a previous time (t−1). Finally, the pixels belonging to the full color range in each of the frames are counted. Similarly, the frames belonging to the full color range in the successive frames of the video can also be counted.

The control unit 300 can determine the attribute of the color range of each of the frames. When a quantity of the pixels having the pixel value that is larger than the upper threshold or is smaller than the lower threshold is calculated for each of the frames, the quantity of the pixels is compared with a quantity threshold, so as to determine an actual color range of the image.

After the pixel values for each of the frames are completely counted, the actual color range of the input image 31 can be determined. For example, the actual color range is determined to be the limited color range. Then, the image-processing system 30 performs a correction procedure for the color range conversion. The various threshold settings and the counting process can be performed by the control unit 300. When the color range conversion is in process, a linear mapping method is incorporated to convert all of the pixels of the image from the limited color range to the full color range. The control unit 300 controls parameters in a gradual conversion method for the color range conversion. The control unit 300 controls a stage for each adjustment in the linear mapping method, and a multi-stage correction process is introduced to perform the color range conversion.

In the present embodiment, the control unit 300 screens the images of the input image 31 that require the color range conversion by the image screening unit 305. In the multi-stage correction process, the stage for each adjustment can be determined. Then, the images are inputted to the linear mapping unit 307, and the linear mapping unit 307 gradually outputs the images (i.e., an output image 32) after the multi-stage correction process.

Figure 6:
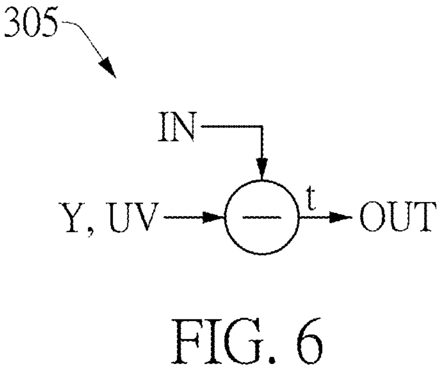
FIG. 6 is a schematic diagram depicting logic circuits that are used for filtering images in the image-processing system according to one embodiment of the present disclosure.

For the implementation of the image screening unit 305, reference can be made to a schematic diagram of the logic circuits shown in FIG. 6. The control unit 300 determines the actual color range of the images by the above-mentioned counting process, so as to form the input value IN of the image screening unit 305. The values of the input image 31 inputted to the image screening unit 305 are obtained. The values are, for example, the components (i.e., the luminance and chrominance) of the YUV color space. Afterwards, an image output value OUT of the image that is required to be processed by the color range conversion can be screened.

Figure 7:
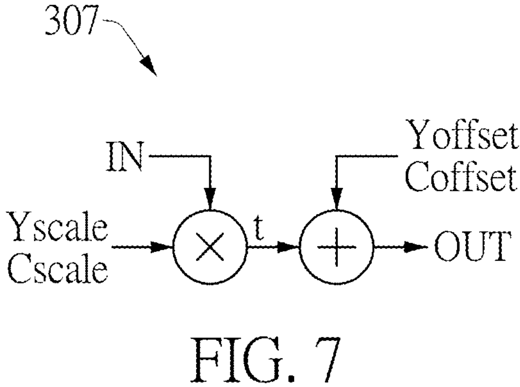
FIG. 7 is a schematic diagram depicting logic circuits that are used to perform a linear mapping method in the image-processing system according to one embodiment of the present disclosure.

The color-range correction procedure uses the linear mapping method that can be embodied by the above-described linear mapping unit 307 of the image-processing system. The linear mapping unit 307 can be implemented by logic circuits shown in FIG. 7. For example, the input pixel values IN of the pixels that are originally in the limited color range can be expressed by color coding in the YUV color space. Here, "Y" represents luminance, and "U" and "V" represent chrominance. The control unit 300 provides two adjusted multipliers Yscale and Cscale (that are, for example, a slope of a linear equation) and two compensation values Yoffset and Coffset, and the gradual conversion method is implemented by the linear mapping unit 307. Through operation of the processing circuit (e.g., the control unit 300 of FIG. 3), the image-processing system 30 gradually performs the color range conversion by the multi-stage correction process. The color range conversion is performed by adjusting one stage in each process of the multi-stage correction process, so as to gradually generate output pixel values OUT until the input image is completely converted to the full color range.

Figure 8:
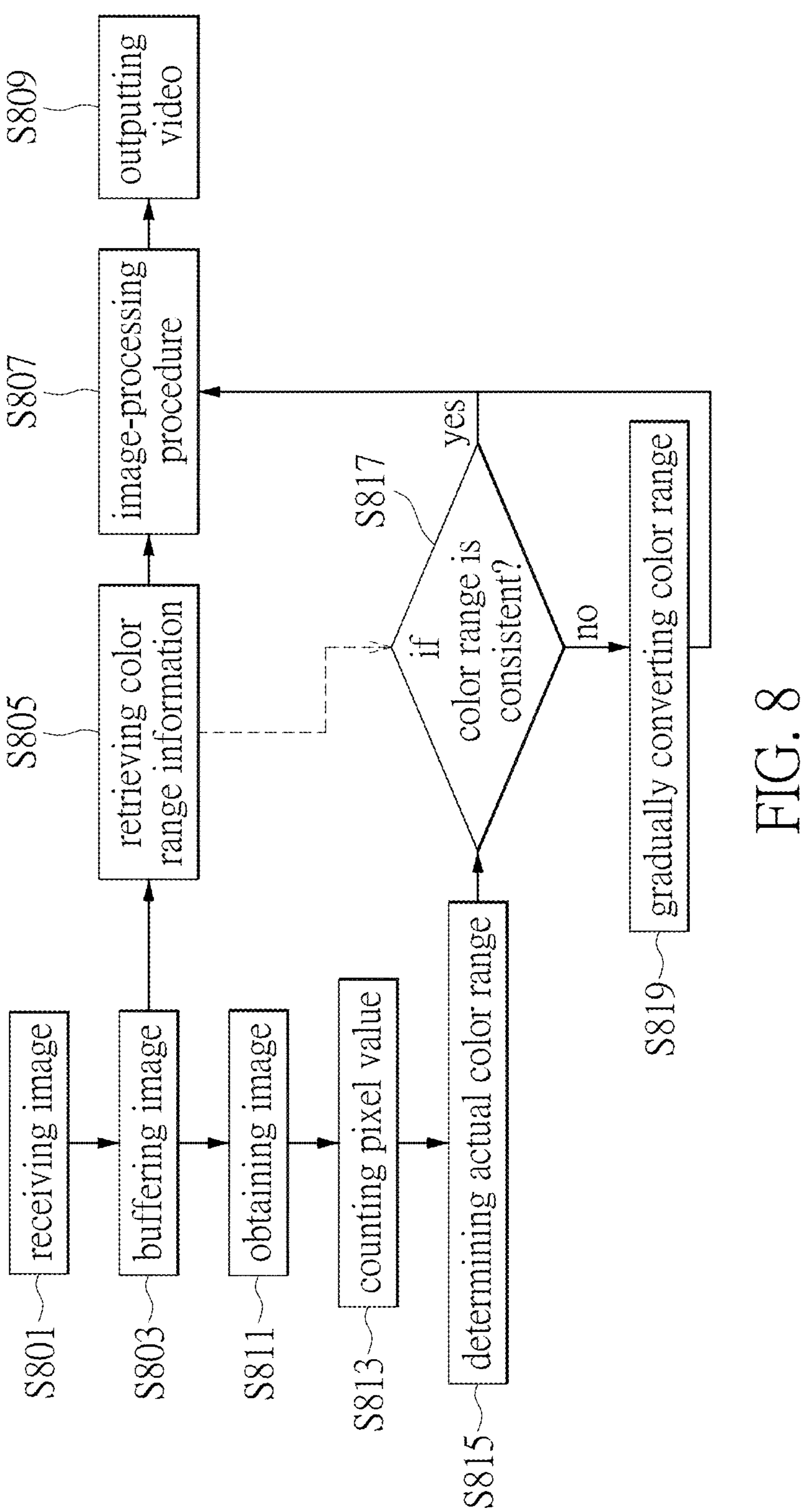
FIG. 8 is a flowchart illustrating the correction method for the image color range conversion according to one embodiment of the present disclosure.

Reference is made to FIG. 8, which is a detailed flowchart illustrating the correction method for the image color range conversion according to one embodiment of the present disclosure. The correction method can be implemented by the image-processing system and the various functional modules that are described in the embodiment of FIG. 1.

When the image-processing system 105 receives the image (step S801), the processing circuit 115 stores the image data to the memory 117 that can be a register for buffering the image data (step S803). Information of the color range recorded in the image packets is obtained (step S805). The image-processing procedure that corresponds to information of the color range is performed (step S807). Under a specific situation, the image of the limited color range can be converted to the image of the full color range. The image can also be combined with the picture of the playback interface before being outputted. That is, the image-processing system 105 outputs a processed video to the display 110 (step S809).

On the other hand, for the subsequent images, the processing circuit 115 of the image-processing system 105 performs the correction method. Firstly, the image data is retrieved from the memory 117 (step S811). The image can be each frame of a streaming video that is received in a frame-by-frame manner. The header of the image packet of the image records information of the color range of the image (e.g., the limited color range). The header of the image packet of the image may also lack information of the color range. In this process, the processing circuit 115 counts the pixel values of the image (step S813), so as to acquire the actual color range of the image.

In an exemplary example, the above-mentioned values are not to be construed as limiting the scope of the present disclosure. A general definition of the color range is divided into the limited color range that contains the pixel values ranging from 16 to 235, and the full color range containing the pixel values ranging from 0 to 255. Therefore, the above-mentioned lower threshold and upper threshold can be used for determining whether the image belongs to the limited color range or the full color range based on the pixel values. In the present example, the lower threshold is set to be 16, and the upper threshold is set to be 235.

The pixel value of each of the pixels (or the sampled pixels) of the image is compared with the upper threshold and the lower threshold, and the pixel values of the pixels are counted. The quantity of the pixels having the pixel values that exceed a threshold (e.g., being larger than the upper threshold or being smaller than the lower threshold) and the quantity of the pixels having the pixel values that are within a threshold range (e.g., being between the upper threshold and the lower threshold) are obtained, such that a distribution of the pixel values can be used to determine the actual color range of the image (step S815). The quantity threshold is provided for preventing noises from interfering with a determination. It is determined that the image belongs to the full color range if the quantity of the pixels having the pixel values that exceed the upper and the lower threshold is larger than the quantity threshold. Conversely, it is determined that the image belongs to the limited color range if the quantity of the pixels having the pixel values that exceed the upper and the lower threshold is smaller than the quantity threshold.

Next, it is determined whether or not the actual color range of the image obtained by counting is consistent with the color range obtained from the image packets of the image (step S817). If the two color ranges are consistent with each other, the corresponding image-processing procedure described in step S807 is performed on the subsequent images. Conversely, if the two color ranges are not consistent with each other, the color-range correction procedure is performed on the images that have the limited color range as the actual color range, so as to correctly process the images. In particular, the gradual conversion method is performed (step S819) for gradually converting the color range through the multi-stage correction process set in the linear mapping method. After the color range of the images are completely converted to the full color range, step S807 is executed for outputting the subsequent images that are combined with the picture of the playback interface to a video-playing device.

Figure 9A:
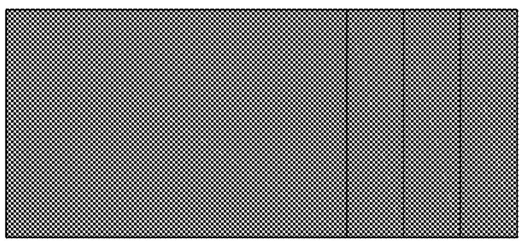
FIGS. 9A to 9C are schematic diagrams illustrating a process of a gradual color range correction method according to one embodiment of the present disclosure.
Figure 9B:
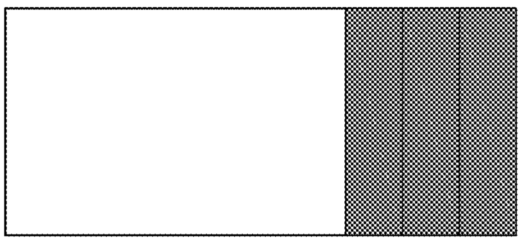
Figure 9C:
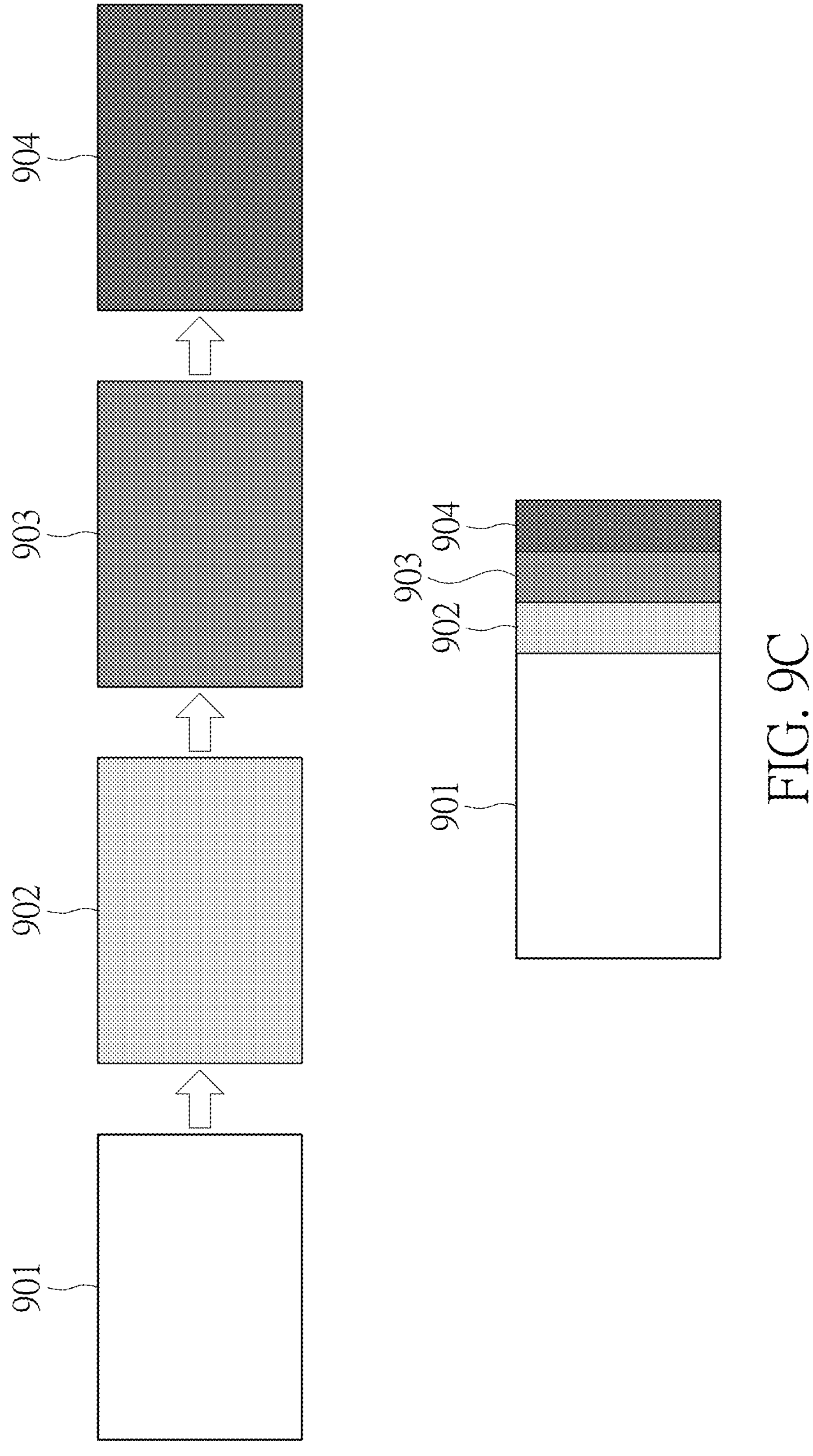

It should be noted that the gradual conversion method allows the video to be smoothly outputted. Reference can be made to FIG. 9A to FIG. 9C, which are schematic diagrams illustrating the gradual color range correction method according to one embodiment of the present disclosure.

In the example of FIG. 9A, the color range obtained from the image packets of the image is shown to be consistent with the actual color range of the image. If all of the images belong to the full color range, the processing circuit of the image-processing system can directly perform the requisite image-processing procedures for outputting the video (which include combining with the picture of the specific playback interface). If the color range obtained from the image packets and the actual color range are both determined to be the limited color range, the processing circuit of the image-processing system performs a regular color range conversion upon the images that are configured to be outputted after being combined with the picture of the specific playback interface. FIG. 9A exemplarily shows a video with successive images that are consistent and without the need for correction.

In an exemplary example shown in FIG. 9B, when the color range obtained from the image packets is inconsistent with the actual color range, the images processed by the processing circuit of the image-processing system based on the color range obtained from the image packets have a distortion problem. Thus, it is necessary for the processing circuit to correct the subsequent images outputted by the image-processing system based on the actual color range obtained from the buffered images. As shown in FIG. 9B, while the output video is corrected as a result of an instant correction, a sudden change in brightness or color may occur during the correction process.

FIG. 9C shows an exemplary example that incorporates the gradual conversion method in the correction process. According to correction times set by the image-processing system (e.g., N>2), the correction process begins with a first frame 901 (frame N=0) in the beginning, and then "N" times of corrections are performed on the subsequent frames. In the present example, "N" equals to 3. In the present example, a first stage correction is performed on the first frame 901 so as to obtain a next frame, i.e., a second frame 902 (frame N=1), a second stage correction is performed on the second frame 902 for obtaining a third frame 903 (frame N=2), and a third stage correction is performed on the third frame 903 so as to obtain a fourth frame 904 (frame N=3) that is a final corrected frame presently. The gradual conversion method allows the image-processing system to output a video with smooth changes of brightness or color due to "N" times of gradual corrections. It should be noted that the exemplary example shown in FIG. 9C is not to be construed as limiting the scope of the present disclosure. The more times the gradual corrections are performed (i.e., the greater "N" is), the less affected the displayed image is by the correction (i.e., the smoother the displayed image is).

In summation, in the correction method for the image color range conversion and the image-processing system provided by the present disclosure, one of the primary inventive concepts is to use hardware for detecting the actual color range of the images of the video, and to use software for gradually filling in adjustment coefficients. In this way, gradual color range conversion can be achieved. One of the problems to be solved in the correction method is that, in view of an incorrect image processing when the actual color range of the video is inconsistent with the color range directly obtained from the image packets, the color-range correction procedure is performed by the image-processing system for the subsequent images. In the color-range correction procedure, the multi-stage correction process is incorporated for gradually performing the color range conversion on the subsequent images in an accurate and smooth manner.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A correction method for image color range conversion, comprising:

receiving an image that is stored to a buffer; and counting a pixel value of the image in the buffer to obtain an actual color range of the image, wherein, in response to the actual color range being inconsistent with a color range recorded in image packets, a color-range correction procedure is performed for correctly processing the image;

wherein the color-range correction procedure adopts a gradual conversion method that gradually performs color range conversion on the image based on a multi-stage correction process that is to adjust one stage in each process to output one image at a time, until the image is completely converted in order to correctly perform a subsequent image-processing procedure.

2. The correction method according to claim 1, wherein the actual color range of the image is determined according to a statistical result of the color range of the image, and the actual color range is a full color range or a limited color range.

3. The correction method according to claim 2, wherein the step of counting the pixel value of the image includes:

comparing the pixel value of all pixels or sampled pixels of the image with an upper threshold and a lower threshold;

calculating a quantity of the pixels having the pixel value that is larger than the upper threshold or is smaller than the lower threshold; and comparing the quantity of the pixels with a quantity threshold, so as to determine the actual color range of the image.

4. The correction method according to claim 3, wherein the limited color range of luminance of the pixels ranges from $16*2^{n-8}$ to $235*2^{n-8}$, and the limited color range of chrominance of the pixels ranges from $16*2^{n-8}$ to $240*2^{n-8}$, wherein, in response to the pixel value of the full color range being from 0 to $2^n-1$, the lower threshold is set to be $16*2^{n-8}$, the upper threshold for the luminance is set to be $235*2^{n-8}$, and the upper threshold for the chrominance is set to be $240*2^{n-8}$, wherein "n" represents a number of image sequence bits, and a minimum value thereof is 8, such that $n \geq 8$.

5. The correction method according to claim 2, wherein the color range recorded in a header of the image packet is the full color range or the limited color range.

6. The correction method according to claim 5, wherein, when the color range recorded in the header of the image packet is the limited color range but the actual color range is the full color range, the color-range correction procedure is performed on images to be inputted after the image.

7. The correction method according to claim 6, wherein the color-range correction procedure uses a linear mapping method to convert all of the pixels of the image from the limited color range to the full color range.

8. An image-processing system, which performs image color range conversion, the image-processing system comprising:

a processing circuit and a buffer, wherein the processing circuit performs a correction method for the image color range conversion, and the correction method includes:

receiving an image that is stored to the buffer; and counting a pixel value of the image in the buffer to obtain an actual color range of the image, wherein, in response to the actual color range being inconsistent with a color range recorded in image packets, a color-range correction procedure is performed for correctly processing the image;

wherein the color-range correction procedure adopts a gradual conversion method that gradually performs color range conversion on the image based on a multi-stage correction process that is to adjust one stage in each process to output one image at a time, until the image is completely converted in order to correctly perform a subsequent image-processing procedure.

9. The image-processing system according to claim 8, wherein the image-processing system is adapted to an audio-visual device; wherein, after the image-processing system performs the image color range conversion, the image is combined with a picture of a playback interface, and then is outputted.

10. The image-processing system according to claim 8, wherein the actual color range of the image is determined according to a statistical result of the color range of the image, and the actual color range is a full color range or a limited color range.

11. The image-processing system according to claim 10, wherein the step of counting the pixel value of the image includes:

comparing the pixel value of all pixels or sampled pixels of the image with an upper threshold and a lower threshold;

calculating a quantity of pixels that the pixel value is larger than the upper threshold or is smaller than the lower threshold; and comparing the quantity of pixels with a quantity threshold so as to determine the actual color range of the image.

12. The image-processing system according to claim 10, wherein, when the color range recorded in a header of the image packet is the limited color range but the actual color range is the full color range, the color-range correction procedure is performed on images to be inputted after the inputted image.

13. The image-processing system according to claim 12, wherein the color-range correction procedure uses a linear mapping method to convert all of the pixels of the images from the limited color range to the full color range.

* * * * *